(12) United States Patent
Kirchev

(10) Patent No.: US 9,368,802 B2
(45) Date of Patent: Jun. 14, 2016

(54) HIGH CAPACITY GASEOUS DIFFUSION ELECTRODE

(75) Inventor: Angel Zhivkov Kirchev, Aix-les-Bains (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 291 days.

(21) Appl. No.: 14/123,358

(22) PCT Filed: Jun. 22, 2012

(86) PCT No.: PCT/FR2012/000252
§ 371 (c)(1),
(2), (4) Date: Dec. 2, 2013

(87) PCT Pub. No.: WO2013/007887
PCT Pub. Date: Jan. 17, 2013

(65) Prior Publication Data
US 2014/0120429 A1    May 1, 2014

(30) Foreign Application Priority Data
Jun. 24, 2011    (FR) ..................... 11 01961

(51) Int. Cl.
*H01M 4/86*    (2006.01)
*H01M 4/88*    (2006.01)
*H01M 12/06*   (2006.01)

(52) U.S. Cl.
CPC .......... *H01M 4/8657* (2013.01); *H01M 4/8626* (2013.01); *H01M 4/8875* (2013.01); *H01M 4/8896* (2013.01); *H01M 12/065* (2013.01); *Y02E 60/50* (2013.01); *Y10T 156/1044* (2015.01)

(58) Field of Classification Search
CPC ........................................................ H01M 4/86
See application file for complete search history.

(56) References Cited

U.S. PATENT DOCUMENTS 3,532,548 A    10/1970    Stachurski
3,623,914 A  * 11/1971   William ............... H01M 12/065
                                                        429/136

(Continued)

FOREIGN PATENT DOCUMENTS

| FR | 1 541 350 | * 10/1968 |
| JP | A-61-82672 | 4/1986 |
| JP | 2009-218105 | * 9/2009 |

OTHER PUBLICATIONS

JP 2009-218105 MT.*

(Continued)

*Primary Examiner* — Patrick Ryan
*Assistant Examiner* — Alex Usyatinsky
(74) *Attorney, Agent, or Firm* — Oliff PLC

(57) ABSTRACT

A method of producing a gaseous diffusion electrode, including the provision of a stack comprising successively a diffusion layer for a gas, a catalytic layer and a diffusion layer for an electrolyte, the deformation of the stack in such a way as to place opposite one another first and second portions of one of the two diffusion layers, and the bonding of the first and second portions with the aid of a polymer material. A gaseous diffusion electrode is furnished with a stack comprising successively a diffusion layer for a gas, a catalytic layer and a diffusion layer for an electrolyte. Two portions of one of the two diffusion layers are disposed opposite one another and separated by a first layer of polymer material.

7 Claims, 5 Drawing Sheets

(56) References Cited

U.S. PATENT DOCUMENTS

| | | | | |
|---|---|---|---|---|
| 3,772,089 | A | | 11/1973 | Bennett et al. |
| 4,988,581 | A | * | 1/1991 | Wycliffe ............. H01M 2/0255 429/210 |
| 5,411,815 | A | * | 5/1995 | Goldstein ........... H01M 12/065 429/50 |
| 5,516,599 | A | * | 5/1996 | Korall ................. H01M 12/065 429/48 |
| 2002/0177036 | A1 | * | 11/2002 | Faris ....................... H01M 2/14 429/129 |
| 2007/0202401 | A1 | * | 8/2007 | Viavattine ............. H01M 4/382 429/209 |
| 2010/0119919 | A1 | * | 5/2010 | Iarochenko ......... H01M 2/0207 429/405 |
| 2011/0083966 | A1 | * | 4/2011 | Kirchev ................ C04B 35/524 205/161 |

OTHER PUBLICATIONS

FR 1 541 350.*
Pan et al., "Preliminary study of alkaline single flowing Zn—$O_2$ battery," Electrochemistry Communications, Sep. 2009, vol. 11, pp. 2191-2194.
Serov et al., "Review of non-platinum anode catalysts for DMFC and PEMFC application," Applied Catalysis B: Environmental, Apr. 2009, vol. 90, pp. 313-320.
Jan. 10, 2012 Search Report issued in French Application No. 1101961 (with English-language translation.).
Aug. 17, 2012 International Search Report issued in International Application No. PCT/FR2012/000252.

* cited by examiner

HIGH CAPACITY GASEOUS DIFFUSION ELECTRODE

BACKGROUND OF THE INVENTION

The invention relates to a gaseous diffusion electrode, and more specifically to a bifunctional oxygen electrode used in a metal-air battery.

STATE OF THE ART

Metal-air batteries use the oxygen of the atmosphere and a metal as reactants to generate electricity. They are the subject of many developments due to their high power density. For example, zinc-air batteries have a theoretical power density in the order of 820 Ah/kg.

FIG. 1 shows a zinc-air electrolyte flow battery such as described in article "Preliminary study of alkaline single flowing battery" (J. Pan et al., Electro-chemistry Communications 11 (2009) 2191-2194). The battery comprises a positive electrode (also called air cathode) formed of a nickel foam 2 and of two catalytic membranes 4, 6 on either side of foam 2. A metallic current collector 8 is used as a negative electrode (anode). An alkaline electrolyte 10 flows between the positive and negative electrodes.

In this type of battery, the cathode is called bifunctional, that is, it operates in charge as well as in discharge mode. In discharge mode, the oxygen is reduced at the level of catalytic membrane 4 in contact with air, and during the charge, the oxygen is regenerated by oxidation of the electrolyte on catalytic layer 6. Nickel foam 2 here plays the role of a mechanical support and of a current collector.

On the anode side, zinc 12 electrodeposits on collector 8 during the charge and dissolves in electrolyte 10 during the battery discharge.

FIG. 2 shows another conventional configuration of bifunctional air cathode. The cathode comprises a single catalytic layer 14, instead of two in FIG. 1. Layer 14 is arranged between two electrically-conductive porous membranes 16 and 18. Membranes 16 and 18 form the mechanical support of catalyst material 14 and are used as current collectors. They are called diffusion layers, since the air oxygen and the electrolyte ions penetrate into their pores and diffuse all the way to catalyst material 14.

Catalytic layer 14 is where the reactions of oxygen reduction and evolution (production) take place. The material of layer 14, that is, the active electrode material, is a paste formed of carbon particles or fibers, of catalysts, of hydrophilic and hydrophobic binders, and of a solvent. The distribution between the quantity of hydrophobic binder and the quantity of hydrophilic binder conditions the quality of the electrode operation.

Membrane 16, in contact with air, is a carbon fiber sheet made hydrophobic, for example, by a coating based on carbon chains, to prevent the penetration of air dampness into the electrode. The sheet has pores of microscopic size, with a diameter in the range between 1 µm and 100 µm.

Membrane 18, on the electrolyte side, is a nickel grid or a carbon fiber cloth. Membrane 18 is hydrophilic and comprises microscopic pores (from 0.1 µm to 50 µm), which eases the diffusion of electrolyte 10 towards catalytic layer 14. The surface of membrane 18 in contact with the electrolyte is generally covered with an additional catalyst layer (not shown), for example, a layer of nickel hydroxide ($Ni(OH)_2$) in the case of an alkaline electrolyte. This layer enables to improve the electrocatalytic properties of the cathode for the oxygen evolution reaction and to increase its lifetime.

Layers 14, 16, and 18 are generally laminated, at high or low temperature, to form the air cathode. During this manufacturing step, the active material partly penetrates into the pores of membranes 16 and 18, which increases the catalytic activity.

For certain applications, the air cathode is optimized by replacing composite layer 14 with two stacked catalytic layers of different natures. The catalytic layer in contact with membrane 16 (reaction with oxygen) is hydrophobic while the layer in contact with membrane 18 (reaction with the electrolyte) is hydrophilic and generally thinner.

The reaction speed of air on the cathode is much lower than that of the metal at the anode. Thus, the air cathode is one of the elements limiting the battery power.

To increase the capacity of the positive electrode, it is known to increase its reaction surface area. Now, such surface area increase can hardly be envisaged in the case of a planar structure such as those in FIGS. 1 and 2. Indeed, to increase the reaction surface area, the transverse electrode dimensions (length and width) should be increased, which would impose strong constraints on the battery sizing. Such constraints would in the end adversely affect the operation of a metal-air battery, especially in terms of electrolyte management.

Document JP61082672 describes another configuration of a tube-shaped gaseous diffusion electrode. Two catalytic layers are bonded to each other, and then rolled to form concentric cylinders. The layers are then rigidly attached by sintering. The electrolyte flows inside of the tube and air reacts with the outer surface of the tube. Such an electrode is difficult to integrate in a conventional battery or requires an in-depth modification of the battery organization. Further, the layer attachment technique does not guarantee a sufficient tightness for a proper operation of the electrode.

Document FR1541350 describes a corrugated oxygen electrode and a metal-gas electrochemical cell containing this electrode. The plate-shaped electrode contains platinum as a catalyst material and has corrugated surfaces. This specific shape enables to increase the reaction surface area of the electrode without substantially increasing its dimensions. However, this electrode is difficult to integrate in an electrochemical metal-gas cell. In particular, attaching this electrode to the cell walls with no risk of electrolyte leakage is difficult.

SUMMARY

There obviously is a need to provide a gaseous diffusion electrode having large reaction surfaces, with a robust architecture adapted to battery packages to ease its integration therein.

This need tends to be satisfied by the provision of a stack successively comprising a gas diffusion layer, a catalytic layer, and an electrolyte diffusion layer. Two portions of each diffusion layer are arranged in front of each other and separated by a layer of thermoplastic polymer material. A frame essentially made of the thermoplastic polymer material forms lateral surfaces of the electrode.

It is also aimed at a method which is fast and easy to implement to form such an electrode.

This aim tends to be achieved by means of the steps of:
a) providing a stack successively comprising a gas diffusion layer, a catalytic layer, and an electrolyte diffusion layer;
b) forming a first layer of thermoplastic polymer material on the gas diffusion layer and a second layer of thermoplastic polymer material on the electrolyte diffusion layer, the first and second layers each having the shape of a frame at the periphery of the associated diffusion layer;

c) deforming the stack to arrange in front of each other two portions of the gas diffusion layer;

d) deforming the stack to arrange in front of each other two portions of the electrolyte diffusion layer; and e) bonding the opposite portions of each diffusion layer by means of the thermoplastic polymer material of the first and second layers.

According to a development, the opposite portions are bonded by thermal treatment.

BRIEF DESCRIPTION OF THE DRAWINGS

The foregoing and other features and advantages will more clearly appear from the following non-limiting description of specific embodiments in connection with the accompanying drawings, among which.

DESCRIPTION OF A PREFERRED EMBODIMENT

Figure 1:
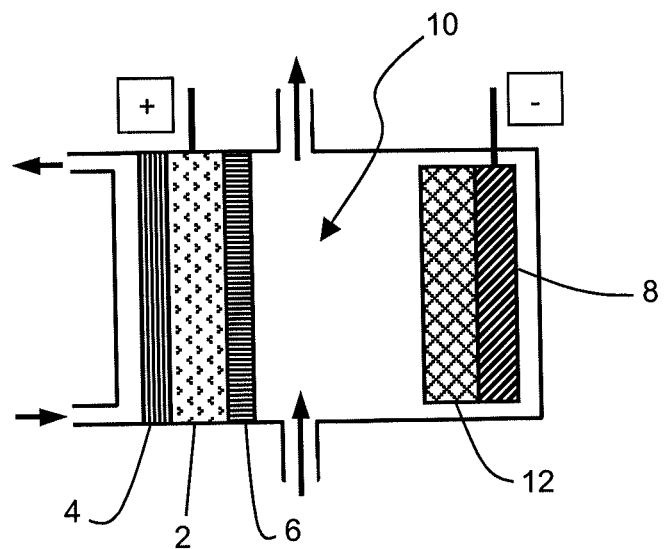
FIG. 1, previously described, shows a zinc-air electrolyte flow battery according to prior art.
Figure 2:
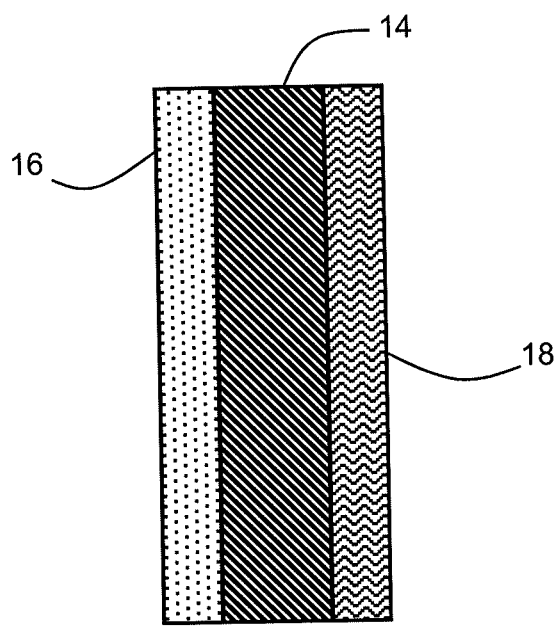
FIG. 2, previously described, shows an air diffusion electrode according to prior art.

To significantly increase the power of the air cathode, the volume of a stack successively comprising an air diffusion layer, a catalytic layer, and an electrolyte diffusion layer, such as that shown in FIG. 2, is deformed. The stack is folded or curved to arrange in front of each other two portions of one of the diffusion layers. Such a deformation is maintained by means of a polymer layer arranged between the two portions and used as glue. Advantageously, the stack is folded in one direction, and then in the opposite direction, several times, as if a serpentine were desired to be formed.

A cathode with a catalytic layer and corrugated diffusion layers is thus obtained. The cathode then has larger reaction surfaces, for identical transverse dimensions. However, the cathode gains thickness (the distance separating the "air" side from the "electrolyte" side of the battery) due to the folding. However, the cathode thickness is less constraining than the other dimensions for its integration in a battery. A compact structure, easy to integrate in a conventional battery, is thus obtained.

Further, the electrode is robust. The folding is maintained by a polymer material, easy to use, for example, by being previously deposited on the stack.

Figure 3:
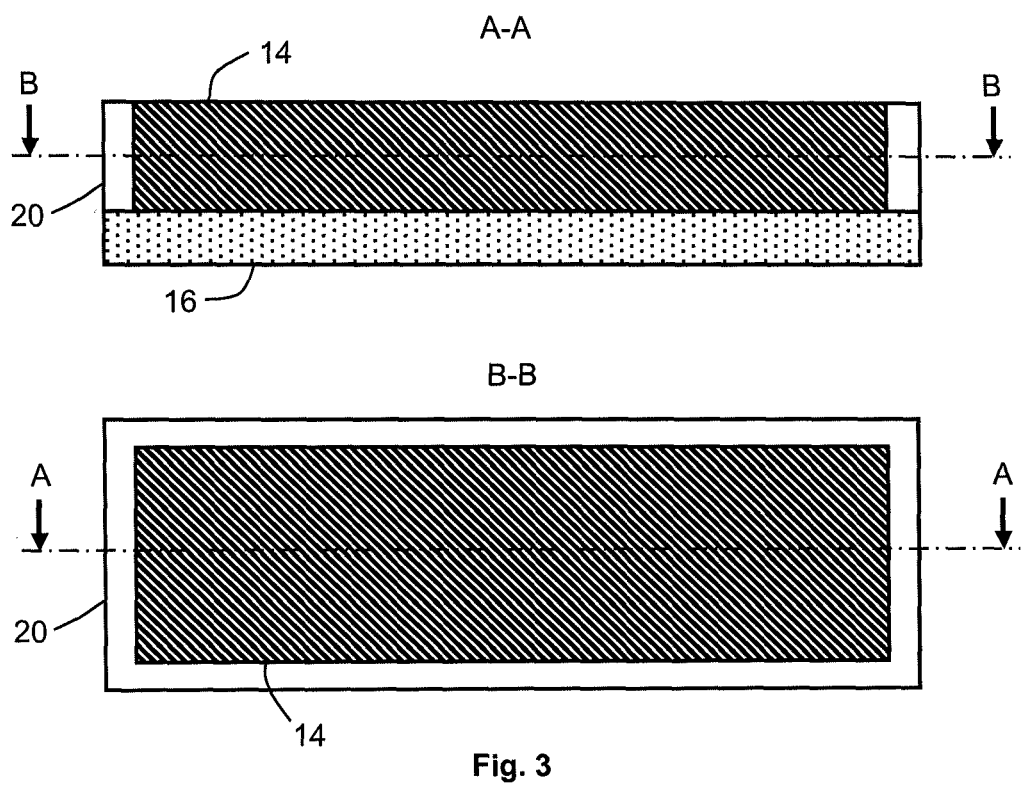
FIGS. 3 to 5 show steps of a method of forming a gaseous diffusion electrode, according to a preferred embodiment of the invention.
Figure 4:
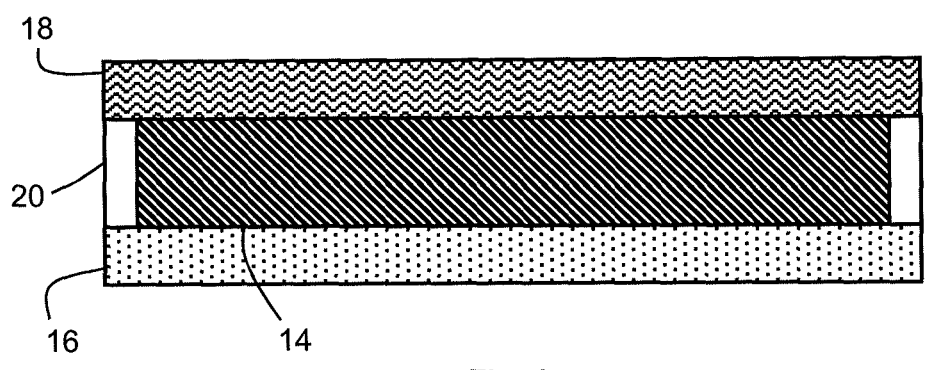
Figure 5:
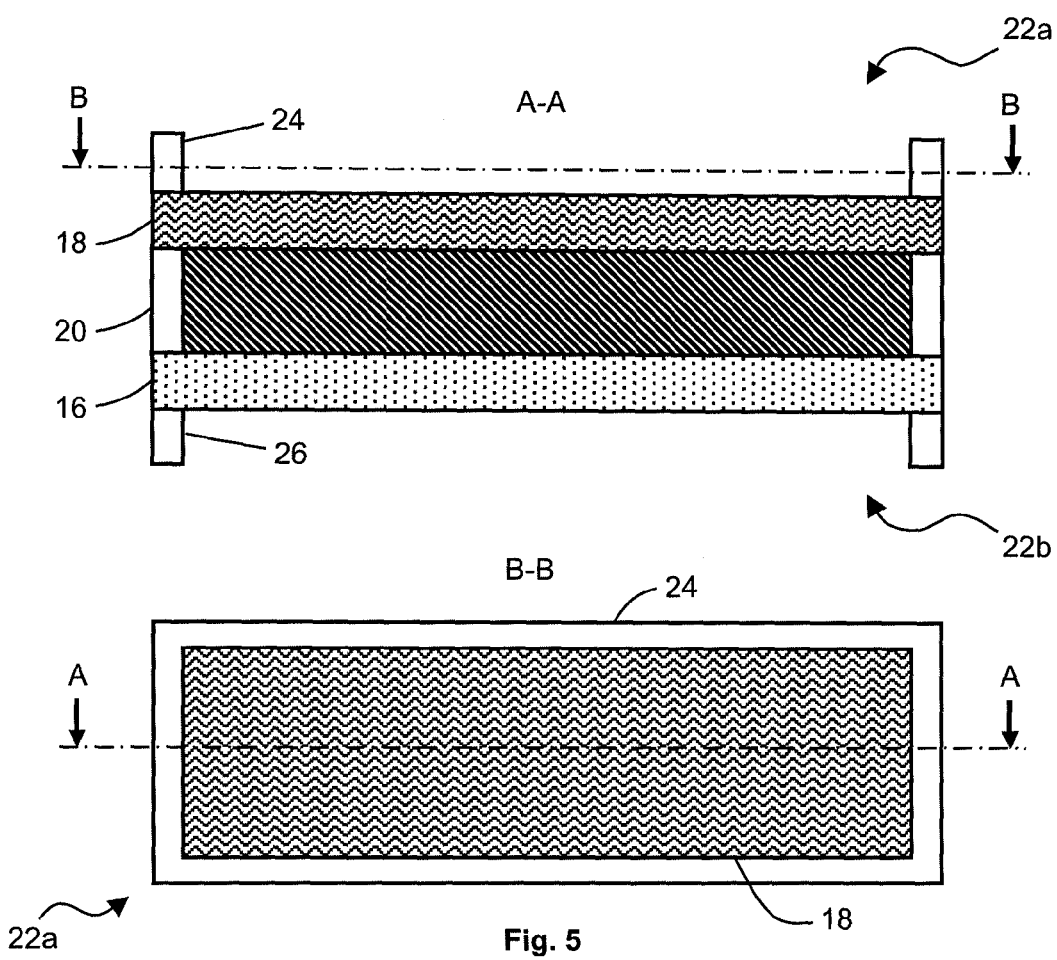

FIGS. 3 to 5 show a preferred embodiment of a method for forming such an electrode.

A first step, shown in front view (cross-section along axis A-A) and in top view (cross-section along axis B-B) in FIG. 3, comprises covering one of the diffusion layers, for example, air diffusion layer 16, with catalytic layer 14. Preferably, layer 16 comprises a carbon fiber sheet having a thickness between 100 μm and 300 μm and active material 14 is deposited in the form of a paste, across a thickness ranging between 100 μm and 300 μm.

The paste preferably contains carbon fibers or particles, catalysts, hydrophilic and hydrophobic binders, and at least one solvent. As an example, the solvent is selected from among water, polyvinyl alcohol, and n-methylpyrrolidone (NMP), the hydrophobic binder is polytetrafluoroethylene (PTFE) or polyvinylidene fluoride (PVDF), and the hydrophilic binder is polyvinyl alcohol (PVA), polyvinylpyrrolidone (PVP), or silica nanoparticles. The carbon particles support the catalytic centers, preferably based on platinum, cobalt, nickel, or iron.

In an alternative embodiment, catalytic layer 14 is formed to two sub-layers of different natures, one being hydrophilic and the other hydrophobic, aiming at separating the location of the reduction reaction from the location of the oxygen evolution reaction.

A layer 20, made of polymer material inert with respect to the active material, is advantageously formed on diffusion layer 16, around catalytic layer 14. Layer 20 thus forms a frame at the periphery of layer 14. The polymer material is preferably selected from among thermoplastic polymers, polypropylene, polyethylene, polystyrene, polyvinyl chloride (PVC), and polyvinylidene fluoride (PVDF), in particular. Polymer 20 may be deposited in different forms, for example, by emulsion or in a solution.

Frame 20 may also be formed before the deposition of the active material. It is for example laminated on carbon sheet 16 and then filled with paste 14 of active material along its entire height.

In FIG. 4, diffusion layer 18 associated with the electrolyte is formed on catalytic layer 14 and polymer frame 20. Layer 18 preferably comprises a carbon fiber cloth having a thickness between 100 μm and 300 μm. Layer 18 may be added by hot or cold lamination.

The next step corresponds to the forming of a layer of polymer material on at least one of the two diffusion layers and, in the preferred embodiment of FIG. 5, on each of the diffusion layers. The polymer layers are preferably laminated on the stack of FIG. 4.

In FIG. 5, each diffusion layer supports a layer of polymer material, in the form of a frame arranged at its periphery. Thus, surface 22a of the stack corresponding to layer 18, is covered with a frame 24 and the opposite surface 22b, corresponding to layer 16, is provided with a frame 26.

In this preferred embodiment, upper frame 24 and inner frame 26 are arranged vertically in line with intermediate frame 20 and are made of the same thermoplastic material. Frames 24 and 26 have identical thicknesses, between 2 and 10 mm. The width of frames 24 and 26 is in the range between 5 and 20 mm.

The stack is then folded several times widthwise (perpendicularly to axis A-A in FIG. 5), in one direction and then in the opposite direction. In other words, the stack is deformed to place in contact two portions of frame 24 on surface 22a (FIG. 5; B-B cross-section), and then two portions of frame 26 on surface 22b. This operation is then repeated in different areas of the stack, as if waves were desired to be drawn.

After this deformation step, the stack is submitted to a thermal treatment, preferably at a temperature between 150° C. and 250° C. Then, the thermoplastic polymer forming frames 24 and 26 softens and the portions in contact of frames 24 and 26 are sealed. After the thermoplastic material has cooled down, the plies of the stack are solidly set.

Figure 6:
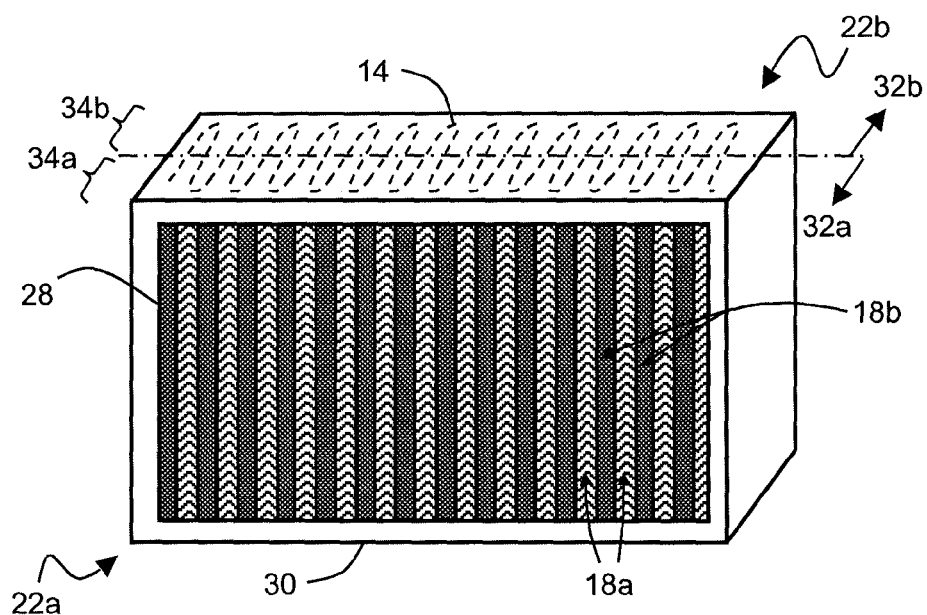
FIGS. 6 and 7 show in three dimensions a gaseous diffusion electrode according to the embodiment of FIGS. 3 to 5.

FIG. 6 shows the gaseous diffusion electrode obtained after such a thermal treatment step. The electrode is generally in the shape of a rectangle cuboid. It comprises, at its center, a structure 28 formed of the catalytic layer and of the diffusion layers. Structure 28 comprises two main surfaces 22a and 22b, curved and respectively corresponding to diffusion layers 18 and 16. Catalytic layer 14, at the center of this structure, is shown in dotted lines. Structure 28 further comprises lateral surfaces surrounded with a frame 30.

Main surface 22a of structure 28 is serpentine-shaped. This specific geometry is shown in FIG. 6 by interlaced dark and light slices. Light slices 18a correspond to areas of diffusion layer 18 close to the electrode surface (in the direction indicated by arrow 32a) and dark slices 18b correspond to areas of layer 18 which sink into the electrode (in the direction indicated by arrow 32b).

In the example of FIG. 6, the dark and light slices have substantially the same area. The stack having been deformed symmetrically, this means that areas 18a are located in one half 34a of the electrode and that areas 18b are located in remaining half 34b.

Each of areas 18a and 18b of the diffusion layer is intended to come into contact with an electrolyte. The access of the electrolyte to areas 18a is almost instantaneous, given their proximity with the edge of the electrode. However, to access an area 18b, the electrolyte dives into a slot corresponding to the location between two consecutive areas 18a. This spacing (that is, the width of an area 18b) is smaller than or equal to the cumulated thickness of two bonded polymer portions, that is, twice the thickness of frame 24. It is preferably between 100 µm and 500 µm.

Figure 7:
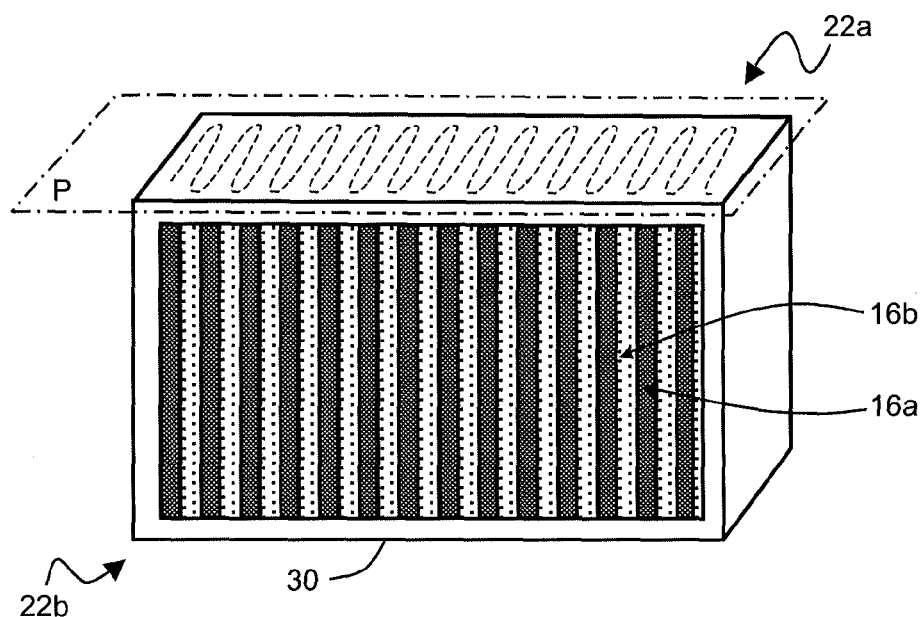

FIG. 7 shows the gaseous diffusion electrode on the side of main surface 22b. Similarly, surface 22b is formed of diffusion layer 16 corrugated during the folding step. Like diffusion layer 18, layer 16, in contact with air, is shown in several areas. Areas 16a are located inside of the electrode and areas 16b are located on the electrode edge.

Figure 8:
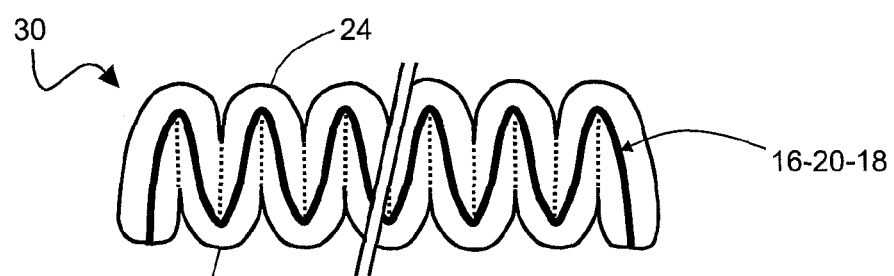
FIG. 8 is a cross-section view of the gaseous diffusion electrode, along cross-section plane P of FIG. 7.

FIG. 8 is a cross-section view of the electrode of FIG. 7 in the upper portion of frame 30, along a plane P perpendicular to main surfaces 22a and 22b.

Frame 30 is formed by the edges of the stack, that is, diffusion layers 16 and 18 nested in layers 20, 24, and 26 of thermoplastic polymer material (FIG. 5). In the upper portion and the lower portion of frame 30, the edges of the stack have been folded on themselves. In FIG. 8, the stack of layer 16, 20, and 18 is shown by a single thick full line while the folding areas of the polymer material are shown in dotted lines. Since the thickness of frames 24 and 26 is larger than that of layers 16 and 18, frame 30 is essentially made of thermoplastic polymer material.

The presence of frames 24 and 26 of thermoplastic polymer material (plus third frame 20, if need be) eases the electrode integration in a battery package. In particular, once folded, frames 24 and 26 form, in the lower portion and the upper portion of the electrode, planar surfaces which will be used to properly attach or bond the electrode in the package. Further, the electrode bonding surface in the package is increased with respect to a conventional corrugated electrode having no frame 30. The battery tightness regarding the electrolyte is thereby greatly improved.

Frame 30 forms a first armature of the electrode. It mechanically strengthens structure 28 of the electrode. When the thermoplastic polymer material is electrically conductive, it further takes part in transporting current in the electrode.

Figure 9:
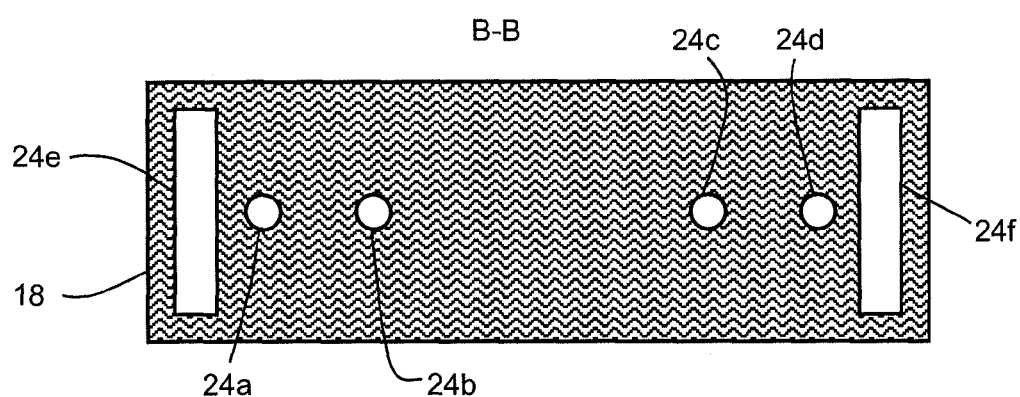
FIG. 9 shows alternative embodiments of the step of FIG. 5.

FIG. 9 shows other embodiments of polymer layer 24 on diffusion layer 18. Rather than forming a single pattern on the edges of layer 18, the polymer layer may be deposited discontinuously, that is, in separate patterns. The patterns may besides have different geometries.

As an illustration, the polymer layer may be deposited in two cylindrical pellets 24a and 24b in a first area in the middle of layer 18, and in two other cylindrical pellets 24c and 24d, aligned with pellets 24a and 24b, in a second area. In this case, pellet 24a may come into contact with pellet 24b, forming a first ply, and pellet 24c may come into contact with pellet 24d to form a second ply.

In an alternative embodiment, the polymer layer is deposited in two rectangular strips 24e and 24f, respectively at the left and right ends of layer 18. In this configuration, strips 24e and 24f are bonded together, for example, by the thermal treatment. The stack is then only folded once. Structure 28 will then be V-shaped, or possibly U-shaped, depending of the thickness of the pattern of polymer material.

The use of two thermoplastic materials is preferred since they enable to durably set the stack deformation after a thermal treatment. The electrode then has a long lifetime.

Figure 10:
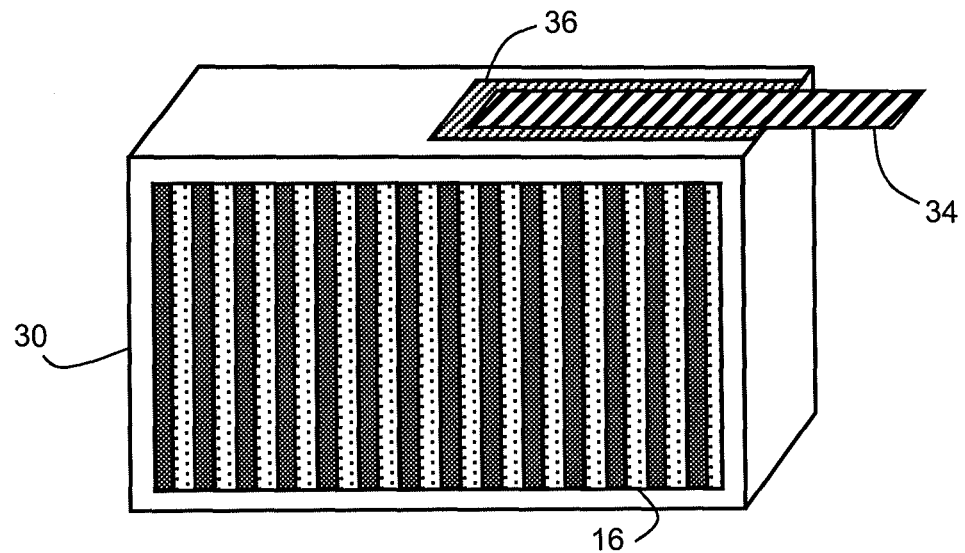
FIGS. 10 to 11 show additional steps of a method of forming gaseous diffusion electrodes according to the invention.
Figure 11:
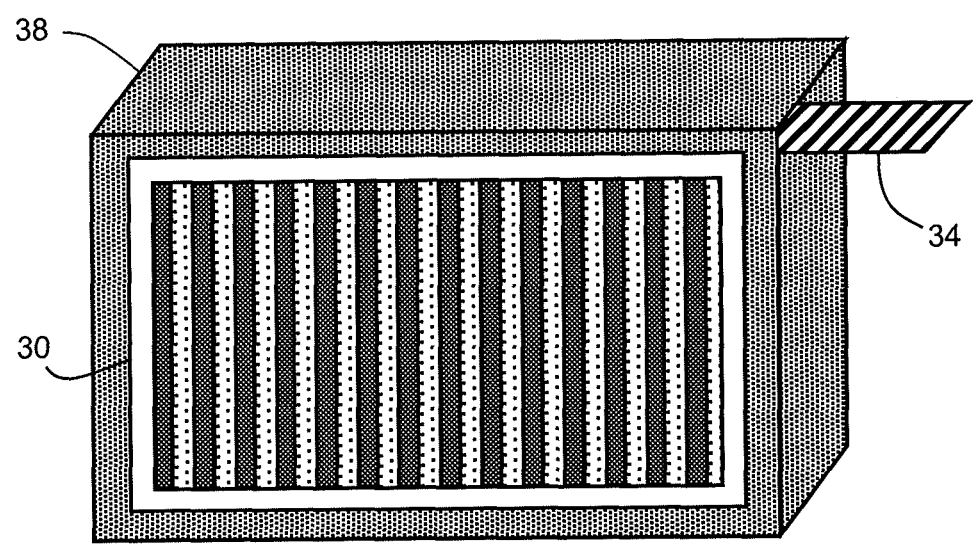

FIGS. 10 and 11 show optional additional steps which further improve the electrode integration in the battery.

The step of FIG. 10 comprises placing a metallic current collector 34 on one of the surfaces of frame 30 when said frame is electrically conductive. Such a collector may form one of the terminals of the battery, to connect it to an external electric circuit. It may also be used to interconnect several air cathodes. The electrons are then conveyed to the catalytic layer, via conductive membranes 16 and 18, frame 30, and collector 34. The collector is for example made of nickel or copper.

Advantageously, the surface of frame 30 is partially or totally covered with a thin metal layer 36 (metallization). This enables to fasten current collector 34 by welding. The metal of layer 36 is for example nickel or a nickel and cobalt alloy deposited in vapor phase (PVD, CVD).

In the case of an electrically-insulating thermoplastic polymer material, the conduction of electrons by frame 30 is not sufficient. It can then be envisaged to form a metal grid on one or the other (or both) of main surfaces 22a and 22b of the electrode, in contact with diffusion layer 18 or 16. This grid is then connected to current collector 34.

Preferably, the grid is arranged on the side of layer 16 in contact with air. Thus, the current density is made uniform over the entire electrode surface, without however being an obstacle to the oxygen supply of the cathode. The grid is for example based on aluminum, bronze, copper, or titanium.

In FIG. 11, a second armature 38 is formed around frame 30. External frame 38 consolidates internal frame 30 and gives the electrode its final shape, to best fit with the battery package which receives the electrodes. External frame 38 is preferably obtained by molding of a plastic material around internal frame 30.

The invention claimed is:

1. A method of manufacturing a gaseous diffusion electrode, comprising the steps of:
   a) providing a stack successively comprising a gas diffusion layer, a catalytic layer, and an electrolyte diffusion layer;
   b) forming a first layer of thermoplastic polymer material on the gas diffusion layer and a second layer of thermoplastic polymer material on the electrolyte diffusion layer, the first and second layers of thermoplastic polymer material each having a shape of a frame of the associated diffusion layer;
   c) folding the stack to arrange a first portion and a second portion of the gas diffusion layer in front of each other;
   d) folding the stack to arrange a first portion and a second portion of the electrolyte diffusion layer in front of each other; and
   e) bonding the first and second portions of the gas diffusion layer by means of the thermoplastic polymer material of the first layer, f) bonding the first and second portions of the electrolyte diffusion layer by means of the thermoplastic polymer material of the second layer.

2. A method according to claim 1, wherein the bonding of the first and second portions of the gas diffusion layer is performed by thermal treatment, and wherein the bonding of the first and second portions of the electrolyte diffusion layer is performed by thermal treatment.

3. A method according to claim 1, wherein steps c) and d) are repeated in several areas of the stack.

4. A method according to claim 1, further comprising a step of forming a third frame of thermoplastic polymer material at the periphery of the catalytic layer, in front of the first and second layers of thermoplastic polymer material.

5. A gaseous diffusion electrode provided with a stack successively comprising a gas diffusion layer, a catalytic layer, and an electrolyte diffusion layer, wherein the stack is folded so that a first portion and a second portion of the gas diffusion layer are arranged in front of each other and separated by a first layer of thermoplastic polymer material, and a first portion and a second portion of the electrolyte diffusion layer are arranged in front of each other and separated by a second layer of thermoplastic polymer material, wherein a frame essentially made of the thermoplastic polymer material of the first and second layers forms lateral surfaces of the electrode.

6. An electrode according to claim 5, wherein the stack is arranged in a serpentine shape.

7. An electrode according to claim 5, wherein the folded area of the stack is arranged between two bonding areas of the gas diffusion layer and of the electrolyte diffusion layer.

* * * * *